United States Patent [19]
Sandré et al.

[11] Patent Number: 6,094,572
[45] Date of Patent: Jul. 25, 2000

[54] METHOD OF GENERATING A RANDOM NUMBER FROM A RADIO SIGNAL

[75] Inventors: Benoît Sandré; Gabriel Fernandez, both of Le Mans, France

[73] Assignee: U.S. Philips Corporation, New York, N.Y.

[21] Appl. No.: 09/008,336

[22] Filed: Jan. 16, 1998

[30] Foreign Application Priority Data

Jan. 21, 1997 [FR] France .................................. 97 00580

[51] Int. Cl.[7] .............................. H04Q 7/34; G07C 15/00
[52] U.S. Cl. ...................... 455/411; 455/462; 455/517; 455/67.1; 380/23; 340/825.34
[58] Field of Search .................................. 455/410, 411, 455/462, 463, 464, 67.1, 517, 526, 39; 340/825.3, 825.34; 380/23, 33, 34; 235/70 R; 370/212

[56] References Cited

U.S. PATENT DOCUMENTS

| | | | |
|---|---|---|---|
| 3,688,090 | 8/1972 | Rankin | 235/70 R |
| 4,345,323 | 8/1982 | Chang | 370/212 |

FOREIGN PATENT DOCUMENTS

4213988A1  11/1993  Germany .................... G07C 15/00

*Primary Examiner*—Reinhard J. Eisenzopf
*Assistant Examiner*—Lester G. Kincaid
*Attorney, Agent, or Firm*—Dicran Halajian

[57] ABSTRACT

A method of generating a random number is disclosed for forming an identification code used for mutual identification between a base station and a mobile telephone. The method includes receiving a radio signal by the base station or the mobile telephone; performing time intervals measurements separating passages of the radio signal through a reference level; and forming the random number from the time intervals measurements.

15 Claims, 2 Drawing Sheets

METHOD OF GENERATING A RANDOM NUMBER FROM A RADIO SIGNAL

BACKGROUND OF THE INVENTION

The invention relates to a method of generating a random number based on the reception of a radio signal, and to a device for generating a random number from a radio signal supplied by a radio receiver.

The invention also relates to telephone equipment, notably a cordless telephone, comprising means for generating a random number in accordance with such a method.

German patent application DE 42 13 988 A1 filed on Apr. 29, 1992 describes a method of generating a random number from the amplitude of ambient radio noise. The amplitude of the signal received is supplied to an A/D converter and then to a comparator which supplies a binary value. Several binary values thus obtained are subsequently arranged to form a random number.

This method is relatively costly and complex because an A/D converter has to be used.

OBJECTS AND SUMMARY OF THE INVENTION

It is a particular object of the invention to provide a solution which does not have these drawbacks.

To this end, a method of generating a random number according to the invention and as described in the opening paragraph is characterized in that it comprises:

performing at least one measurement of at least one time interval separating passages of said signal through a reference level, and forming said random number from at least a part of one or more of said measurements.

Similarly, a device for generating a random number according to the invention is characterized in that the device comprises:

first means for performing at least one measurement of at least one time interval separating passages of said signal through a reference level, and second means for forming said random number from at least a part of one or more of said measurements.

According to the invention it is sufficient to use, for example, a comparator for supplying a square signal which is representative of the passages of said radio signal through said reference level, and a clock which supplies a time interval measurement separating two edges of said square signal.

Particularly when the method according to the invention is used in telephone equipment provided with a radio receiver and a processor, it is sufficient to use a clock register of said processor to measure the time interval separating two switchings of a port of said processor conveying the signal supplied by said comparator.

In a particularly advantageous embodiment, notably when the method according to the invention is used in a cordless telephone, a random number of n binary elements is formed from p binary elements taken in n/p time interval measurements, and said p binary elements are the p least significant binary elements of said n/p measurements.

Indeed, as the radio environment in which the equipment is used is not foreseeable, the radio signal used may be considered as a random signal. However, when the useful signal is a speech signal, the radio receiver has a passband of between 300 Hz and 3000 Hz. The measured time intervals thus lie between 0.15 ms and 1.5 ms which means that they are not completely random. This embodiment allows improvement of the random character of the number obtained by performing several measurements and by retaining only the least significant part of each of these measurements.

These and other aspects of the invention are apparent from and will be elucidated with reference to the embodiments described hereinafter.

DETAILED DESCRIPTION OF THE PREFERRED EMBODIMENT

The invention relates to a method of generating a random number from a radio signal supplied at the output of a radio receiver. It is applied in a particularly advantageous manner to any equipment provided with a radio receiver and notably to cordless telephone equipment as shown in FIG. 1, for example for generating an identification code.

In a mobile telephone constituted by a base station and a handset which communicate with each other by means of a radio link, a mutual identification mechanism between the base and the handset is realized prior to establishing any radio communication in order to avoid piracy of the telephone line. This mechanism comprises exchanging an identification code which is known for the base station and the handset only and which has previously been chosen at random. It is known from French patent application No. 2559008 to generate this identification code in a random manner in the base station and to use means for matching the handset with the base station so as to transmit the generated identification code to the handset.

Figure 1:
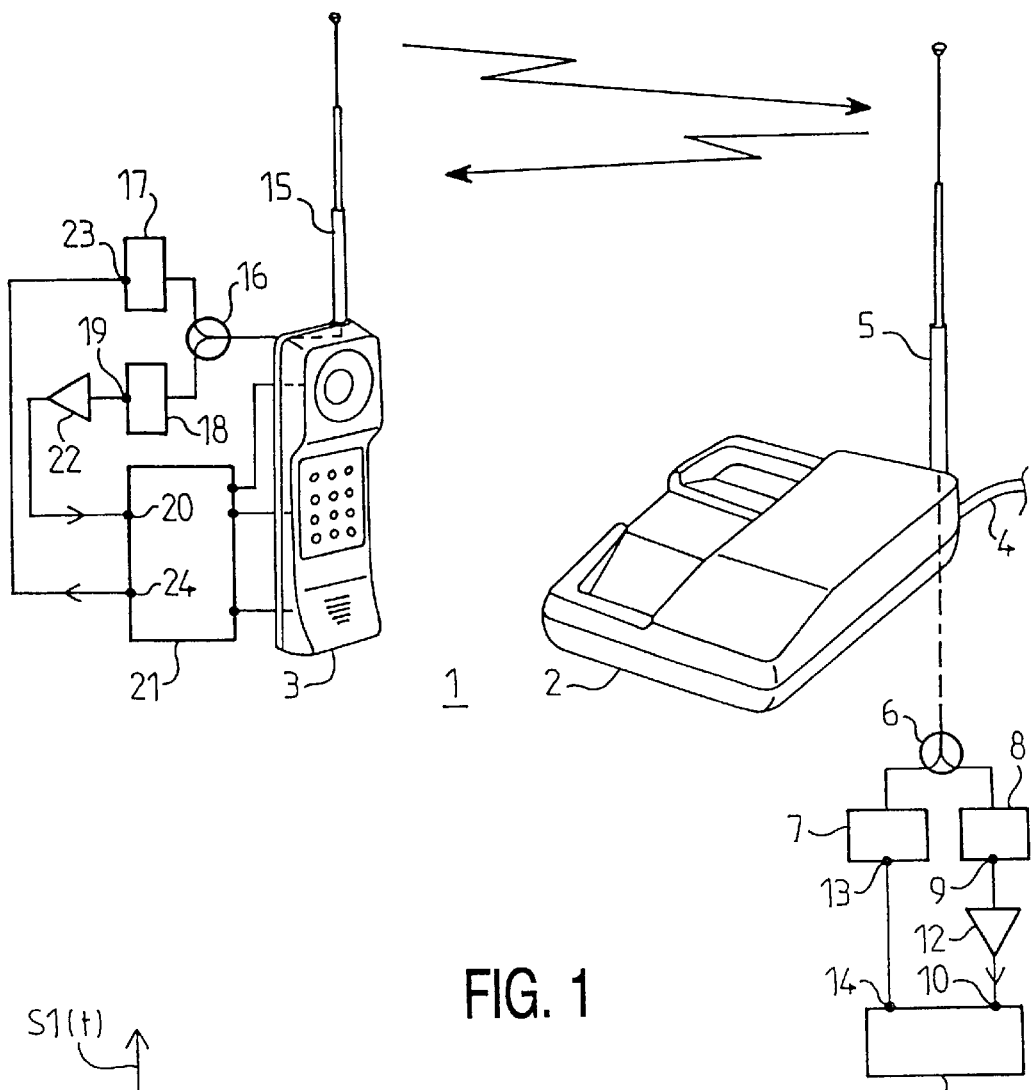
FIG. 1 shows a cordless telephone according to the invention.

FIG. 1 shows a cordless telephone unit 1 according to the invention, comprising a base station 2 and a handset 3. The base station 2 is connected to a wall-terminal by means of a cable 4 and is provided with an antenna 5. The antenna 5 is connected via a transmitter/receiver duplexer 6 to a transmitter 7 and a receiver 8. An output 9 of the receiver 8 is connected to an input 10 of a microprocessor 11 via a comparator 12. An input 13 of the transmitter 7 is connected to an output 14 of the microprocessor 11.

Similarly, the handset 3 is provided with an antenna 15 which is connected via a transmission/reception duplexer 16 to a transmitter 17 and a receiver 18. An output 19 of the receiver 18 is connected to an input 20 of a microprocessor 21 via a comparator 22. An input 23 of the transmitter 17 is connected to an output 24 of the microprocessor 21.

Figure 2A:
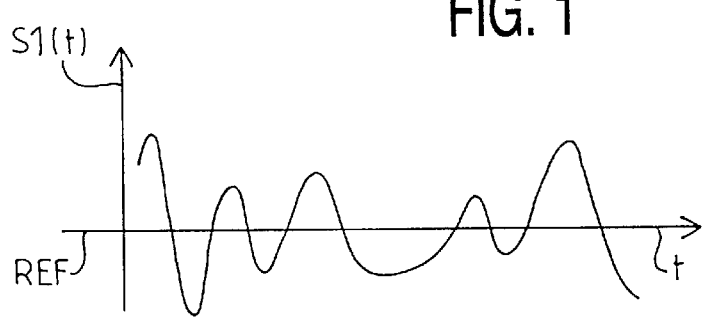
FIGS. 2A and 2B show an example of signals used for carrying the invention into effect.
Figure 2B:
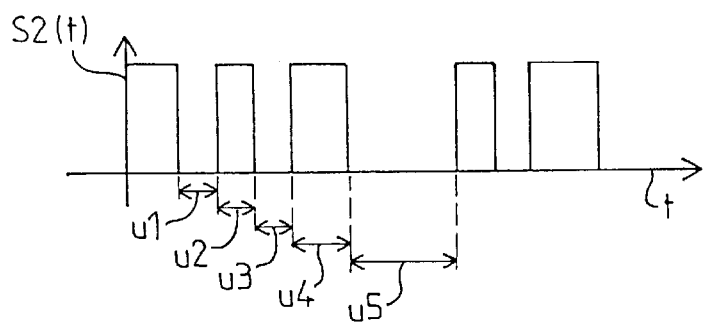

FIG. 2A shows by way of example a signal S1 supplied by one of the radio receivers 8 or 18. This signal S1 is applied to one of the comparators 12 or 22 so as to be compared with a reference level REF. The signal S2 available at the output of said comparator is shown in FIG. 2B. It is a square signal whose edges correspond to the passage of the signal S1 through the reference level REF. This signal S2 is present at one of the inputs 10 or 20 of the microprocessor 11 or 21.

The method according to the invention comprises measuring time intervals between two switchings of the ports 10 or 20 with the aid of a clock register of the microprocessor 11 or 21, i.e. between two passages of the signal S1 through the reference level REF.

The radio environment in which the equipment is used is not naturally foreseeable; nevertheless, as already explained, the time between two triggerings depends on the passband of the receiver. To improve the quality of the random number obtained, several precise measurements of said time intervals are taken and only the least significant part of the results obtained is used. For example, for obtaining a random number of 20 binary elements, 5 time interval measurements u1, u2, u3, u4 and u5 are carried out and the 4 least significant binary elements of each of these 5 measurements are used.

Figure 3:
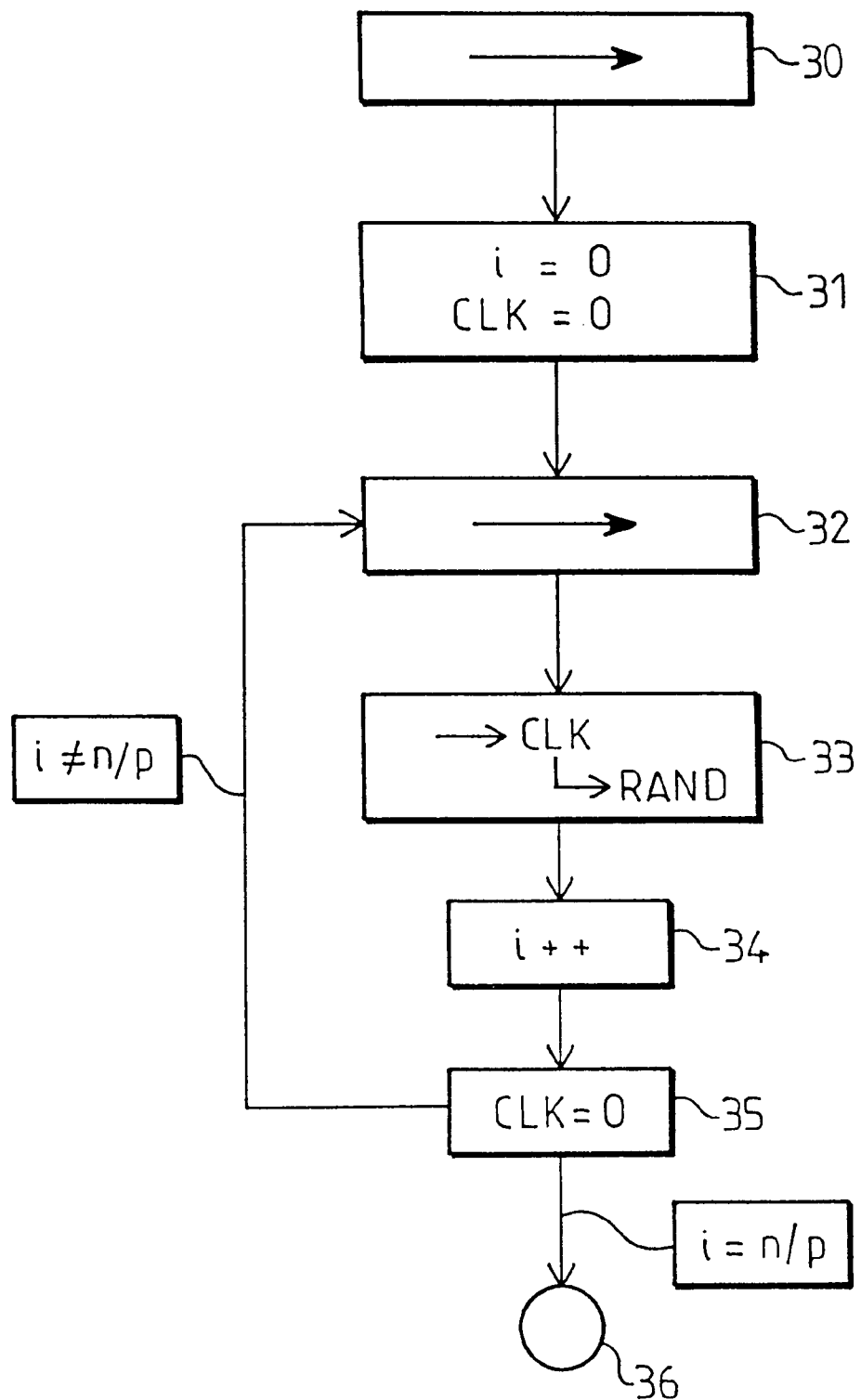
FIG. 3 shows a flow chart of the different steps of a method of generating a random number according to the invention.

FIG. 3 is a flow chart showing the different steps of a method of generating a random number according to the invention.

In step 30, the microprocessor 11 or 21 is in a standby position for a switch at its port 10 or 20, respectively. As soon as such a switch is effected, the operation is continued in step 31. In step 31, a variable i and a clock register CLK of the microprocessor are set to zero. Subsequently, in step 32, the microprocessor is rendered standby again for a switch at its port 10 or 20. When this switch is realized, the operation continues in step 33. In step 33, the contents of the clock register CLK are read and the p least significant binary elements are stored in p sites of a variable RAND. In step 34, the counter i is incremented by one unit, and in step 35, the clock register CLK is re-initialized. As long as the value of the counter i is different from n/p, the operation is resumed in step 32. When i=n/p, it will end in step 36.

What is claimed is:

1. A method of generating a random number for forming an identification code used for mutual identification between a base station and a mobile telephone comprising:

receiving a radio signal by one of said base station and said mobile telephone;

performing a plurality of measurements of time intervals separating passages of said radio signal through a reference level; and forming said random number from a portion of each of said plurality of measurements.

2. The method of claim 1, wherein said random number has p binary elements and said forming act forms said random number from n binary elements of each of said measurements.

3. The method of claim 2, wherein said n binary elements are least significant bits of each of said measurements.

4. The method of claim 1, wherein said forming act forms said random number from n/p number of said measurements, wherein said random number has p binary elements and is formed from n binary elements of each of said n/p number of said measurements.

5. The method of claim 4, wherein said n binary elements are least significant bits of each of said n/p number of said measurements.

6. Telephone equipment comprising means for generating a random number in accordance with the method of claim 1.

7. A device for generating a random number to form an identification code used for mutual identification between a base station and a mobile telephone comprising:

receiving means for receiving a radio signal by one of said base station and said mobile telephone;

measuring means for performing a plurality of measurements of time intervals separating passages of said radio signal through a reference level; and forming means for forming said random number from a portion of each of said plurality of measurements.

8. The device of claim 7, wherein said random number has p binary elements and is formed from n binary elements of each of said measurements.

9. The device of claim 8, wherein said n binary elements are least significant bits of each of said measurements.

10. The device of claim 7, wherein said random number has p binary elements, and is formed from n/p number of said measurements and from n binary elements of each of said n/p number of said measurements.

11. The device of claim 10, wherein said n binary elements are least significant bits of each of said n/p number of said measurements.

12. A cordless telephone comprising said base station and a handset provided with matching means for exchanging said identification code, wherein at least one of said base station and said handset comprises means for generating, in accordance with the method of claim 1, said random number to form said identification code.

13. A mobile telephone for communicating through a base station, wherein at least one of said mobile telephone and said base station includes a device for generating a random number to form an identification code used for mutual identification between said base station and said mobile telephone, said device comprising:

a receiver to receive a radio signal from one of said base station and said mobile telephone; and a processor which performs a plurality of measurements of time intervals separating passages of said radio signal through a reference level and forms said random number from a portion of each of said plurality of measurements.

14. The mobile telephone of claim 13, further comprising a comparator which compares said radio signal with said reference level to form an output signal supplied to said processor.

15. The mobile telephone of claim 13, wherein said processor includes a clock register used for said measurements of time intervals.

* * * * *